United States Patent
Kotani et al.

(10) Patent No.: US 10,801,399 B2
(45) Date of Patent: Oct. 13, 2020

(54) SUPERCHARGING SYSTEM FOR AIRCRAFT RECIPROCATING ENGINE, AIRCRAFT RECIPROCATING ENGINE, AND AIRCRAFT

(71) Applicant: SUBARU CORPORATION, Tokyo (JP)

(72) Inventors: Kazuaki Kotani, Tokyo (JP); Nobuyuki Nakazato, Tokyo (JP); Iwao Murata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/235,762

(22) Filed: Dec. 28, 2018

(65) Prior Publication Data

US 2019/0271263 A1 Sep. 5, 2019

(30) Foreign Application Priority Data

Mar. 1, 2018 (JP) .................................. 2018-036410

(51) Int. Cl.
| | |
|---|---|
| *F02B 39/10* | (2006.01) |
| *B64D 27/02* | (2006.01) |
| *F02D 23/02* | (2006.01) |
| *F02D 41/00* | (2006.01) |
| *F02B 33/34* | (2006.01) |

(52) U.S. Cl.
CPC ............ *F02B 39/10* (2013.01); *B64D 27/02* (2013.01); *F02B 33/34* (2013.01); *F02D 23/02* (2013.01); *F02D 41/0007* (2013.01); *B64D 2027/026* (2013.01)

(58) Field of Classification Search
CPC ... B64D 27/02; B64D 2027/026; F02B 33/34; F02B 39/10; F02D 23/02; F02D 29/02; F02D 29/06; F02D 41/0007; F02D 2200/0406
See application file for complete search history.

(56) References Cited

U.S. PATENT DOCUMENTS

| | | | |
|---|---|---|---|
| 2010/0100300 A1* | 4/2010 | Brooks | ................... F02B 73/00 701/102 |
| 2014/0230430 A1 | 8/2014 | Krug et al. | |
| 2016/0076469 A1* | 3/2016 | Pursifull | .......... F02M 35/10222 123/519 |

FOREIGN PATENT DOCUMENTS

| | | |
|---|---|---|
| JP | 2008-106728 A | 5/2008 |
| JP | 2012-503732 A | 2/2012 |
| JP | 2014-159810 A | 9/2014 |

* cited by examiner

*Primary Examiner* — Brandon D Lee
(74) *Attorney, Agent, or Firm* — Troutman Pepper Hamilton Sanders LLP (57) ABSTRACT

There is provided a supercharging system for an aircraft reciprocating engine, comprising: a plurality of compressors for supplying compressed air to the aircraft reciprocating engine; at least one turbine for obtaining rotational power for at least one of the plurality of compressors, and a plurality of motors for respectively providing rotational power to the plurality of compressors. An object of the present invention is to reduce turbo lag in a reciprocating engine for an aircraft in which multiple-stage supercharging is performed by the turbocharger.

12 Claims, 7 Drawing Sheets

SUPERCHARGING SYSTEM FOR AIRCRAFT RECIPROCATING ENGINE, AIRCRAFT RECIPROCATING ENGINE, AND AIRCRAFT

CROSS-REFERENCE TO RELATED APPLICATIONS

The present application claims priority from Japanese Patent Application No. 2018-036410 filed on Mar. 1, 2018, the entire contents of which are hereby incorporated by reference.

BACKGROUND

1. Technical Field

Examples of the present invention relate to a supercharging system for an aircraft reciprocating engine, an aircraft reciprocating engine, and an aircraft.

2. Related Art

Reciprocating engines are known as engines for aircrafts. Such a reciprocating engine has a motor that converts part of the energy generated by combustion of fuel into reciprocating motion of a piston as expansion work, which is in turn converted into rotational motion of a rotating body connected to the piston. An aircraft, such as a small-propeller aircraft, powered by a reciprocating engine is called a reciprocating aircraft.

The reciprocating aircraft, in which a supercharger, a turbocharger or the like is disposed in the reciprocating engine, is also known as disclosed in Japanese Unexamined Patent Application Publication (JP-A) No. 2014-159810, JP-A No. 2008-106728 or JP-A No. 2012-503732. In particular, a technique has been proposed for allowing a reciprocating aircraft to fly at a high altitude by providing a reciprocating engine with a multi-stage turbocharger.

SUMMARY OF THE INVENTION

An aspect of the present invention provides a supercharging system of an aircraft reciprocating engine including a plurality of compressors configured to supply compressed air to the aircraft reciprocating engine, at least one turbine configured to obtain rotational power for at least one of the plurality of compressors, and a plurality of motors configured to provide rotational power respectively to the plurality of compressors.

An aircraft reciprocating engine according to the example of the present invention may be provided with the above-mentioned supercharging system.

An aircraft may include the aircraft reciprocating engine described above.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

When engine output is throttled in a reciprocating engine in which multi-stage supercharging is performed by a turbocharger, it takes time to restore the engine output. This is because even if the throttle is operated to increase the flow rate of air supplied to the reciprocating engine, it takes time for increasing the exhaust energy to the level where the compressor can perform the required work. This delay in response of the turbocharged reciprocating engine is called turbo lag.

It is therefore desirable to reduce turbo lag in a reciprocating engine for an aircraft in which multi-stage supercharging is performed by a turbocharger.

FIRST EXAMPLE (Configuration and Functions)

Figure 1:
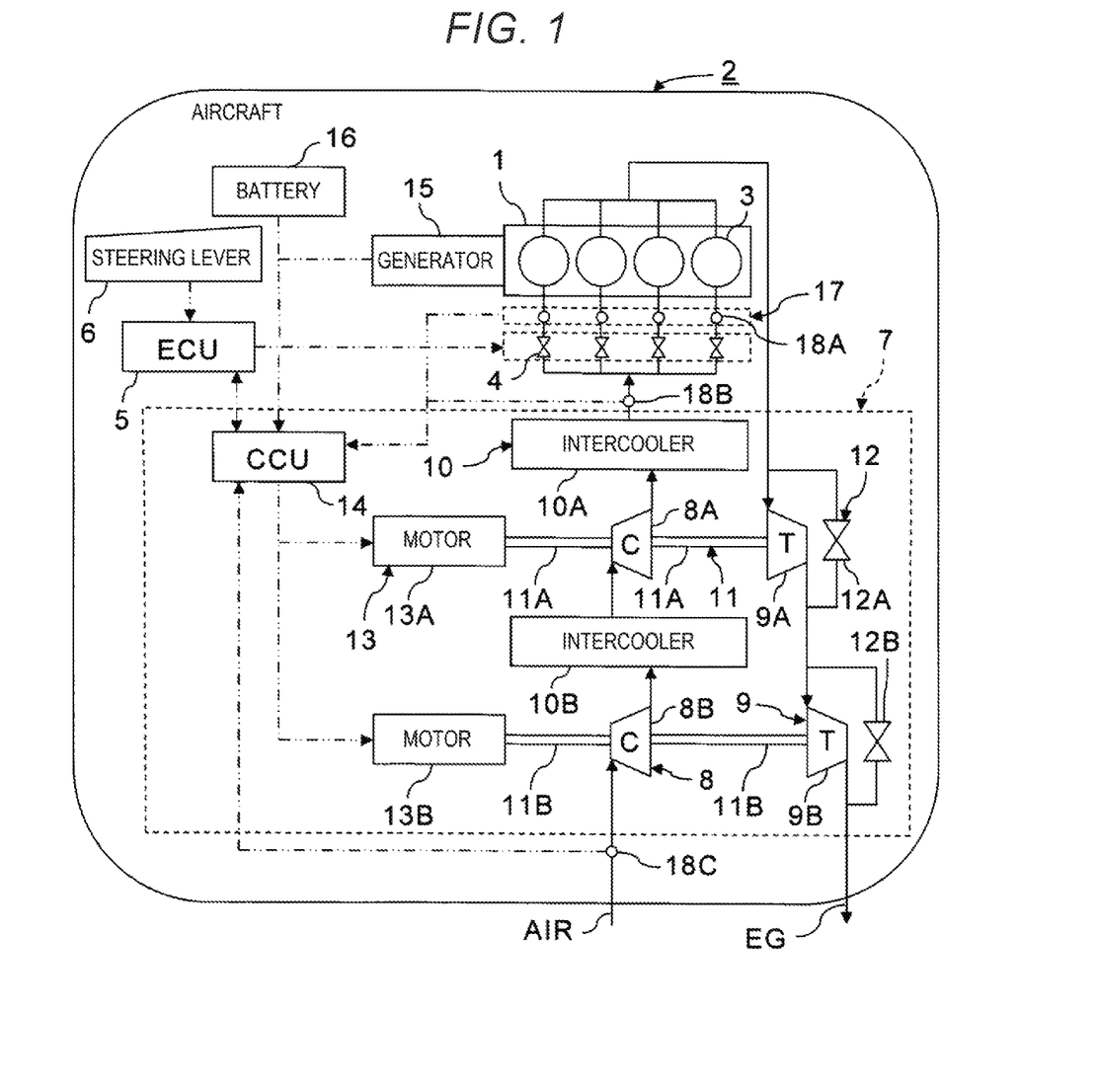
FIG. 1 is a configuration diagram of an aircraft reciprocating engine including a supercharging system according to a first example of the present invention.

FIG. 1 is a configuration diagram of an aircraft reciprocating engine including a supercharging system according to a first example of the present invention.

An aircraft reciprocating engine 1 is provided in an aircraft 2. In other words, the aircraft 2 is a reciprocating aircraft powered by the aircraft reciprocating engine 1. A typical reciprocating aircraft is a propeller aircraft that flies by thrust generated by rotation of a propeller, and the axis of rotation of the aircraft reciprocating engine 1 is coupled to the propeller of the aircraft 2.

The aircraft reciprocating engine 1 comprises a plurality of pistons 3. The aircraft reciprocating engine 1 has a motor that converts heat energy generated by combustion of aircraft fuel into reciprocating motion of each piston 3, and converts the heat energy into rotational motion of a rotary shaft connected to the pistons 3. In this way, air is supplied to the aircraft reciprocating engine 1, mixed with the aircraft fuel, and then combusted. After fuel gas mixed with air performs work and moves the pistons 3, the fuel gas is released as exhaust gas (EG).

A throttle 4 is disposed in each supply pipe for supplying air to each piston 3 constituting the aircraft reciprocating engine 1. The throttle 4 is a throttle valve for controlling the flow rate of air supplied to the piston 3. When the opening degree of the throttle 4 is increased, the flow rate of air supplied to the piston 3 increases so that output of the aircraft reciprocating engine 1 increases.

Each throttle 4 is connected to an engine control unit (ECU) 5 for controlling the aircraft reciprocating engine 1. Each throttle 4 is controlled by a control signal from the engine control unit 5.

The engine control unit 5 is connected to a steering lever 6. Therefore, when an operator of the aircraft 2 inputs an instruction for controlling the opening degree of the throttle 4 to the engine control unit 5 by operating the steering lever 6, each throttle 4 receives a control signal from the engine control unit 5, and the opening degree of each throttle 4 is set to a desired opening degree.

As a specific example, when starting the aircraft reciprocating engine 1 at high altitude or when accelerating the flight speed of the aircraft 2 by increasing the output of the aircraft reciprocating engine 1, the aircraft reciprocating engine 1 can be started or the output of the aircraft reciprocating engine 1 can be increased by inputting an instruction, from the steering lever 6 to the engine control unit 5, to increase the opening degree of the throttle 4.

When the aircraft 2 is a manned aircraft, it is suitable to dispose the steering lever 6 in a cockpit in which a pilot of the aircraft 2 rides. On the other hand, if the aircraft 2 is an unmanned aircraft, the steering lever 6 can be disposed at a remote location so that a remote operator of the aircraft controls the aircraft. Alternatively, even when the aircraft 2 is an unmanned aircraft, the steering lever 6 can be disposed on the airframe, and the steering lever 6 can be controlled not by remote control but by autonomous control of a computer mounted in the airframe.

Further, the aircraft reciprocating engine 1 is provided with a supercharging system 7. The supercharging system 7 is a system for supplying compressed air to the aircraft reciprocating engine 1. That is, the supercharging system 7 is a turbocharger that takes in air from the outside, compresses the air, and supplies the compressed air to the aircraft reciprocating engine 1. In the supercharging system 7, the energy of exhaust gas discharged from the aircraft reciprocating engine 1 is used as energy for compressing air.

The supercharging system 7, like a typical turbocharger, may be configured with a plurality of compressors 8 for supplying compressed air to the aircraft reciprocating engine 1, at least one turbine 9 for recovering energy of exhaust gas discharged from the aircraft reciprocating engine 1 to obtain rotational power for at least one compressor 8 of the plurality of compressors 8, and an intercooler 10 for cooling air, the temperature of which has increased in each compressor 8.

In the instance illustrated in FIG. 1, the supercharging system 7 is configured by two compressors 8, namely, a first compressor 8A on the high-pressure side and a second compressor 8B on the low-pressure side, and a first turbine 9A and a second turbine 9B for obtaining rotational power for the first compressor 8A and the second compressor 8B, respectively.

The second compressor 8B on the low-pressure side is connected to a supply pipe for supplying air to the reciprocating engine 1 on the aircraft at a position upstream from the first compressor 8A on the high-pressure side. Therefore, air taken in from outside of the supercharging system 7 before compression is fed to the second compressor 8B on the low-pressure side. Air compressed to a predetermined pressure by the second compressor 8B on the low-pressure side is outputted to the first compressor 8A on the high-pressure side.

On the other hand, the first compressor 8A on the high-pressure side is connected to a position downstream of the second compressor 8B on the low-pressure side of supply pipe for supplying air to the aircraft reciprocating engine 1. Therefore, air compressed by the second compressor 8B on the low-pressure side is fed to the first compressor 8A on the high-pressure side. Then, air compressed by the first compressor 8A on the high-pressure side, in order to further increase the pressure of the compressed air, is outputted to the pistons 3 of the aircraft reciprocating engine 1.

A first intercooler 10A is disposed between the high-pressure side first compressor 8A and the aircraft reciprocating engine 1. Similarly, a second intercooler 10B is disposed between the second compressor 8B on the low-pressure side and the first compressor 8A on the high-pressure side. Therefore, the compressed air whose temperature has been increased by the compression in the second compressor 8B on the low-pressure side is cooled in the second intercooler 10B, thereby suppressing an excessive increase in temperature of the compressed air. Similarly, the compressed air whose temperature is increased by the compression in the first compressor 8A on the high-pressure side is cooled in the first intercooler 10A, thereby suppressing an excessive increase in temperature of the compressed air.

Thus, the supercharging system 7 illustrated in FIG. 1 is a two-stage turbocharger supplied to the aircraft reciprocating engine 1. The supercharging system 7 increases the air pressure stepwise in the low-pressure second compressor 8B and the high-pressure first compressor 8A.

The first turbine 9A is disposed at a position upstream from the second turbine 9B in the pipe of exhaust gas discharged from the aircraft reciprocating engine 1. On the other hand, the second turbine 9B is disposed at a position downstream from the first turbine 9A in the pipe of exhaust gas discharged from the aircraft reciprocating engine 1.

The first compressor 8A on the high-pressure side is mechanically coupled to the first turbine 9A by a first rotating shaft 11A. The second compressor 8B on the low-pressure side is mechanically coupled to the second turbine 9B by a second rotating shaft 11B.

Further, the pipe of exhaust gas branches off on the upstream side of the first turbine 9A, and a first waste gate valve 12A is disposed in the branched off pipe of exhaust gas. That is, the first waste gate valve 12A is connected in parallel with the first turbine 9A. Similarly, the pipe of exhaust gas branches off on the upstream side of the second turbine 9B, and a second waste gate valve 12B is disposed in the branched off pipe of exhaust gas. That is, the second waste gate valve 12B is connected in parallel with the second turbine 9B.

The first waste gate valve 12A and the second waste gate valve 12B are the valves for controlling the inflow amount of exhaust gas to the first turbine 9A and the second turbine 9B by redirecting a part of the exhaust gas. By providing the first waste gate valve 12A and the second waste gate valve 12B, it is possible to prevent an excessive amount of exhaust gas from flowing into the first turbine 9A and the second turbine 9B, and to prevent the first turbine 9A and the second turbine 9B from rotating at an excessively high rotational speed.

In addition to such a typical turbocharger configuration, the supercharging system 7 is provided with a plurality of motors 13 for respectively controlling the rotational speeds of the plurality of compressors 8, a compressor control unit (CCU) 14 for controlling the outputs of the respective compressors 8 by driving the motors 13, a generator 15 for generating electric power by the power of the aircraft reciprocating engine 1, a battery 16 for storing electric power generated by the generator 15, and various measuring apparatuses 17 for measuring physical quantities such as the pressure and the flow rate of air supplied to the aircraft reciprocating engine 1.

Since the generator 15, the battery 16, and the various measuring instruments 17 are provided in the typical aircraft reciprocating engine 1, the generator 15, the battery 16, and the various measuring instruments 17 originally provided in the aircraft reciprocating engine 1 can be used in the supercharging system 7. However, if the capability is insufficient, equipment may be added as necessary.

The motor 13 is a power source for assisting the driving of the compressor 8 by providing rotational power to the compressor 8 when the output of the compressor 8 needs to be increased, such as when the output of the aircraft reciprocating engine 1 is increased or when the aircraft reciprocating engine 1 is being started.

That is, when the motor 13 is driven, rotational torque transmitted from the motor 13 is applied to each compressor 8 in addition to rotational torque transmitted from the turbine 9. Therefore, it is possible to obtain an output larger than the output of the compressor 8 obtained by driving the turbine 9 alone. When the output of the compressor 8 is to be increased, such as when the output of the aircraft reciprocating engine 1 is increased or when the aircraft reciprocating engine 1 is started, the output of the compressor 8 can be temporarily increased by driving the motor 13.

In the instance illustrated in FIG. 1, the output shaft of a first motor 13A is mechanically connected to the first rotating shaft 11A connecting the first compressor 8A on the high-pressure side and the first turbine 9A. Therefore, power to the first compressor 8A on the high-pressure side is transmitted not only from the first turbine 9A but also from the first motor 13A. The output shaft of a second motor 13B is mechanically connected to the second rotating shaft 11B connecting the second compressor 8B on the low-pressure side and the second turbine 9B. Therefore, power to the second compressor 8B on the low-pressure side is transmitted not only from the second turbine 9B but also from the second motor 13B.

The compressor control unit 14 is a controller configured to controlling the output of the compressors 8 by driving the motors 13. Therefore, the compressor control unit 14 is electrically connected to each motor 13 so as to supply electric power to each motor 13.

Each motor 13 is driven at the time of starting the aircraft reciprocating engine 1 and at the time of increasing the output of the aircraft reciprocating engine 1. Accordingly, the compressor control unit 14 can be provided with a function for detectors when the aircraft reciprocating engine 1 has been started or when the output of the aircraft reciprocating engine 1 has been increased. A start of the aircraft reciprocating engine 1 or an increase of the output of the aircraft reciprocating engine 1 can be detected based on control information of the aircraft reciprocating engine 1 which can be obtained from the engine control unit 5.

That is, when the aircraft reciprocating engine 1 is started or the output of the aircraft reciprocating engine 1 is increased, instruction information for increasing the opening degree of the throttle 4 is inputted from the control lever 6 to the engine control unit 5 as control information of the aircraft reciprocating engine 1. Therefore, when instruction information for increasing the opening degree of the throttle 4 is inputted from the steering lever 6 to the engine control unit 5, the compressor control unit 14 can be notified that the instruction information for increasing the opening degree of the throttle 4 has been inputted from the engine control unit 5.

When this is done, the compressor control unit 14 can automatically detect the start time of the aircraft reciprocating engine 1 and the increase time of the output of the aircraft reciprocating engine 1 based on the control information of the aircraft reciprocating engine 1 obtained from the engine control unit 5, specifically, based on the instruction information for the opening degree of the throttle 4. When the compressor control unit 14 detects the start of the aircraft reciprocating engine 1 and the increase of the output of the aircraft reciprocating engine 1, the compressor control unit 14 can supply appropriate electric power to the motors 13 to drive the motors 13.

In other words, the compressor control unit 14 works in conjunction with the engine control unit 5, and the compressor control unit 14 can be configured to control each motor 13 based on control information of the opening degree of the throttle 4 for controlling the flow rate of air supplied to the aircraft reciprocating engine 1.

Configuring the compressor control unit 14 so as to control not only the turning on and off of the motors 13 but also the rotational speed of the motors 13 is preferable for improving the energy efficiency of the aircraft reciprocating engine 1 provided with the supercharging system 7. That is, it is preferable to provide the compressor control unit 14 with a function for determining the number of revolutions and rotational speed for each compressor 8 and motor 13 so that each compressor 8 rotates as energy-efficiently as possible.

The appropriate rotational speeds of each compressor 8 and motor 13 can be determined based on a compressor map representing the energy efficiency of each compressor 8, the opening degree of each throttle 4 of the aircraft reciprocating engine 1, the measured manifold pressure of air at the inlet of each piston 3 of the aircraft reciprocating engine 1, and the measured intake pressure of air taken from the atmosphere into the low-pressure side second compressor 8B. Further, by measuring the pressure of air at the inlet of the aircraft reciprocating engine 1, it is possible to check whether the charge air pressure required for the aircraft reciprocating engine 1 has been obtained by having each compressor 8 and motor 13 rotating at an appropriate rotational speed.

Therefore, the measuring instrument 17 may be provided with a first pressure sensor 18A for measuring the manifold pressure of air at the inlet of each piston 3, a second pressure sensor 18B for measuring the pressure of air at the inlet of the aircraft reciprocating engine 1, and a third pressure sensor 18C for measuring the intake pressure of air to the supercharging system 7.

In the compressor control unit 14, the manifold pressure of the aircraft reciprocating engine 1, the pressure of the air at the inlet of the aircraft reciprocating engine 1, and the intake pressure of the air to the supercharging system 7 can be measured with the first pressure sensor 18A, the second pressure sensor 18B, and the third pressure sensor 18C, respectively. That is, the first pressure sensor 18A, the second pressure sensor 18B, and the third pressure sensor 18C may be electrically connected to the compressor control unit 14 by signal lines so that the compressor control unit 14 can receive the detection signals of the pressure of the air acquired by the first pressure sensor 18A, the second pressure sensor 18B, and the third pressure sensor 18C.

The opening degree of each throttle 4 can be conveyed from the engine control unit 5 to the compressor control unit 14 as control information of the opening degree of each throttle 4. When the opening degree of each throttle 4 is known, the mass flow rate of air required for the aircraft reciprocating engine 1 can be obtained. Specifically, since the charge air pressure required for the aircraft reciprocating engine 1 is about atmospheric pressure, the mass flow rate of air required for the aircraft reciprocating engine 1 can be obtained based on the charge air pressure and the throttle opening degree.

It is then possible to distribute the supercharging pressure in each compressor 8 so that the energy efficiency of each compressor 8 becomes favorable on the basis of the mass flow rate and the charge air pressure of the air required for the aircraft reciprocating engine 1, the measured manifold pressure of the aircraft reciprocating engine 1, the measured intake pressure of air to the supercharging system 7, and the compressor map representing the energy efficiency of each compressor 8.

Specifically, the total supercharging pressure in the supercharging system 7 can be determined to obtain the mass flow rate of air and the charge air pressure required for the reciprocating engine 1 for an aircraft in the supercharging system 7. The supercharging pressure in each compressor 8 can then be determined on the basis of the compressor map to obtain the total supercharging pressure in the supercharging system 7. Once the supercharging pressure in each compressor 8 is determined, the appropriate rotational speed of each compressor 8 and each motor 13 can be determined.

The function of determining the appropriate rotational speeds of each compressor 8 and each motor 13 based on the opening degree of each throttle 4, the manifold pressure of the aircraft reciprocating engine 1, the measured intake pressure of the supercharging system 7, and the compressor maps representing the energy efficiency of each compressor 8 can be provided in the compressor control unit 14 as described above. It should be noted that a method of obtaining an appropriate rotational speed of each motor 13 based on the compressor map is described in detail in the second example in which the number of compressors 8 is three and the configuration is more complicated than the configuration in the first example.

Whether the charge air pressure required for the aircraft reciprocating engine 1 has been obtained can be confirmed by measuring the pressure of air at the inlet of the aircraft reciprocating engine 1. Therefore, the pressure of air at the inlet of the aircraft reciprocating engine 1 may be measured with the second pressure sensor 18B, and feedback control may be performed to increase the total supercharging pressure of the supercharging system 7 if the pressure of air at the inlet of the aircraft reciprocating engine 1 has not reached the charge air pressure. In this case, the compressor control unit 14 may be provided with a function of feedback-controlling the rotational speed of each motor 13 based on the pressure of air at the inlet of the aircraft reciprocating engine 1.

When the rotational speed of each motor 13 is determined in the compressor control unit 14, electric power is supplied from the compressor control unit 14 to each motor 13 together with a control signal of each motor 13. The electric power supplied to each motor 13 can be generated with a generator 15 that converts kinetic energy of the rotating shaft of the aircraft reciprocating engine 1 into electric energy.

The electric power generated with the generator 15 can be stored in the battery 16. For this purpose, the generator 15 and the battery 16 are electrically connected to the compressor control unit 14. As a result, the plurality of motors 13 provided in the supercharging system 7 can be driven by the electric power stored in the battery 16. However, electric power may be supplied to each motor 13 by an apparatus other than the generator 15. In this case, the generator 15 may be omitted.

As illustrated in FIG. 1, the compressor control unit 14 and the engine control unit 5 may be integrated since both the compressor control unit 14 and the engine control unit 5 can be configured as electronic circuits. The part of the compressor control unit 14 and the engine control unit 5 for processing digital information can be constituted by an electronic circuit such as a computer in which a program is read. If the throttle 4 is a hydraulically or pneumatically driven valve, the engine control unit 5 can be configured using a hydraulic signal circuit or a pneumatic signal circuit.

The supercharging system 7 of the aircraft reciprocating engine 1, the aircraft reciprocating engine 1, and the aircraft 2 as described above are configured such that a plurality of compressors 8 for supplying compressed air to the aircraft reciprocating engine 1 can be driven not only by the turbine 9 but also by the motor 13. That is, a plurality of compressors 8 are electrically driven in a multi-stage turbocharger for an aircraft.

Therefore, with the turbocharging system 7 of the aircraft reciprocating engine 1, the aircraft reciprocating engine 1, and the aircraft 2, the responsiveness of the supercharging pressure of the compressed air supplied to the aircraft reciprocating engine 1 is improved. That is, since the compressor 8 can be instantaneously driven by the motor 13 at the time of starting the aircraft reciprocating engine 1 or at the time of increasing the output of the aircraft reciprocating engine 1, the compressor 8 can be rotated at an appropriate rotational speed even before the rotation speed of the turbine 9 is increased by exhaust gas, unlike a conventional multi-stage turbocharger.

In particular, by operating the opening degree of the throttle 4 of the aircraft reciprocating engine 1 in conjunction with the driving of the motor 13, it is possible to supercharge the aircraft reciprocating engine 1 without causing a time lag. Therefore, even if the number of the compressors 8 and the turbines 9 provided in the supercharging system 7 increases as the demand for high altitudes at which aircrafts 2 can fly increases, it is possible to quickly supply power to the respective compressors 8 and quickly obtain the charge air pressure and the mass flow rate required for the reciprocating engine 1 of the aircraft.

Further, unlike a conventional multi-stage turbocharger, each compressor 8 can be individually controlled by a motor 13. Therefore, each compressor 8 can be used under high-energy efficiency conditions. Further, it is possible to recover the excess energy of exhaust gas which was previously discharged to the atmosphere in the past. As a result, the energy efficiency of the aircraft reciprocating engine 1 can be improved. That is, it is possible to provide the reciprocating engine 1 for an aircraft with high fuel efficiency.

In addition, since the compressor 8 can be driven by the motors 13 even if the pressure of the intake air is low in the aircraft reciprocating engine 1, the aircraft reciprocating engine 1 can be started at a higher altitude than a conventional reciprocating engine having a multistage turbocharger. That is, when the aircraft reciprocating engine 1 stops at high altitude, it is not necessary to lower the altitude of the aircraft 2 to an altitude at which the aircraft reciprocating engine 1 can be restarted only with natural intake air. As a result, it is possible to provide the aircraft 2 capable of staying at a high altitude.

SECOND EXAMPLE

Figure 2:
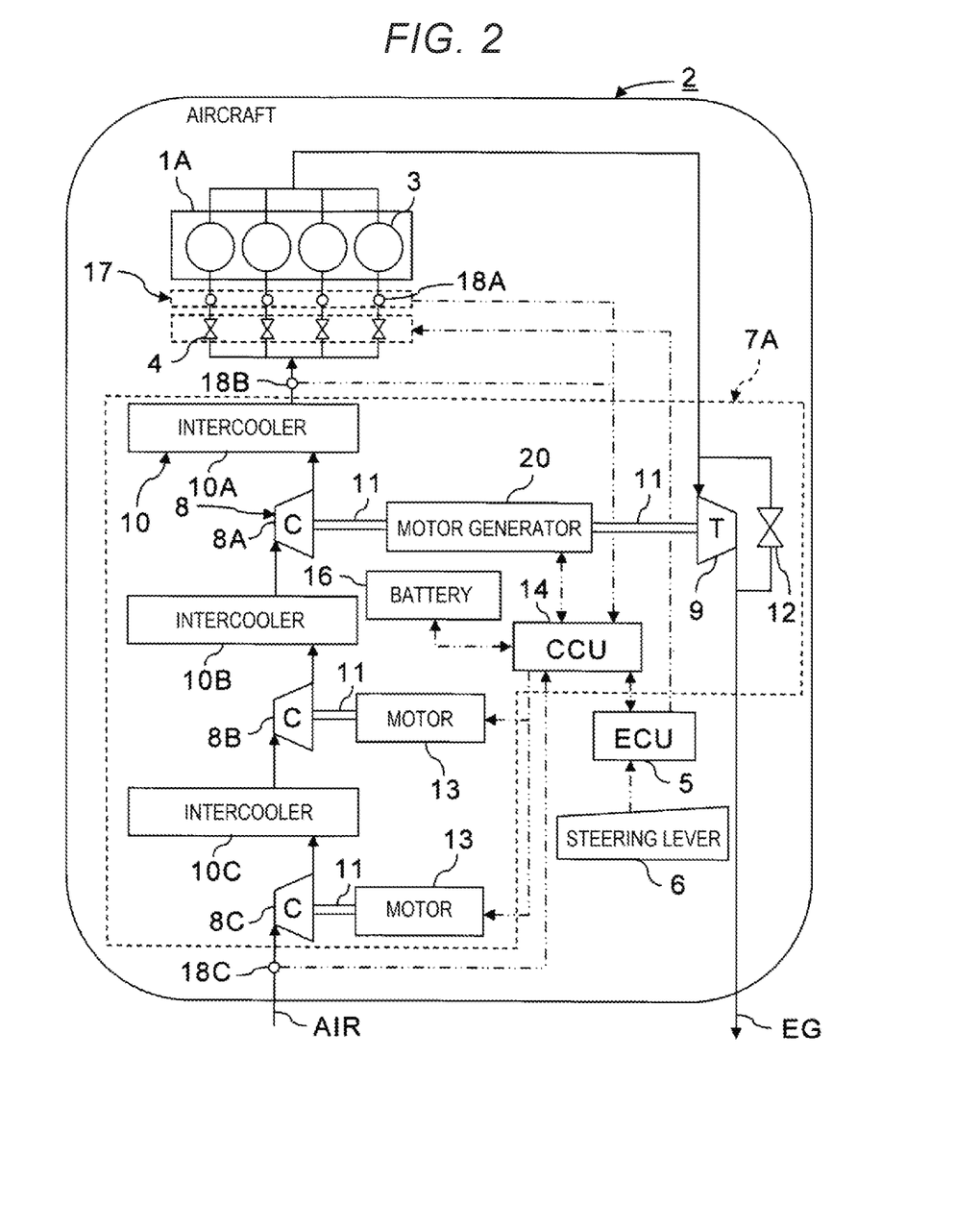
FIG. 2 is a configuration diagram of an aircraft reciprocating engine including a supercharging system according to a second example of the present invention.

FIG. 2 is a configuration diagram of a reciprocating engine for an aircraft including a supercharging system according to a second example of the present invention.

An aircraft reciprocating engine 1A and a supercharging system 7A in the second example illustrated in FIG. 2 are different from the supercharging system 7 in the first example in the number of the compressors 8 and the turbines 9. Further, the generator 15 and one of motors 13 are replaced with a motor-generator (MG) 20. Since other configurations and operations of the supercharging system 7A in the second example are not substantially different from those of the supercharging system 7 in the first example, the same reference numerals are assigned to the same configurations or corresponding configurations, and description thereof is omitted.

The reciprocating engine 1A for an aircraft in the second example has three compressors 8 consisting of a first compressor 8A for a high-pressure stage, a second compressor 8B for a intermediate-pressure stage, and a third compressor 8C for a low-pressure stage. A first intercooler 10A, a second intercooler 10B, and a third intercooler 10C for cooling compressed air are disposed at each of the output sides of the first compressor 8A, the second compressor 8B, and the third compressor 8C for the high-pressure stage, the intermediate-pressure stage, and the low-pressure stage.

The aircraft reciprocating engine 1A is provided with one turbine 9 for obtaining the rotational power of the first compressor 8A. That is, the first compressor 8A is mechanically connected to the turbine 9 by a rotating shaft 11. The pipe of exhaust gas branches off on the upstream side of the turbine 9, and a waste gate valve 12 is disposed in the branched off pipe of exhaust gas. The flow rate of exhaust gas passing through the turbine 9 is controlled by the waste gate valve 12 so that an excessive amount of exhaust gas does not flow into the turbine 9.

On the other hand, the second compressor 8B and the third compressor 8C are both mechanically coupled to a motor 13 for providing rotational power by a rotating shaft 11. Thus, the second compressor 8B and the third compressor 8C are driven with electric energy supplied from the motor 13. Specifically, each of the second compressor 8B and the third compressor 8C is rotated by rotational torque transmitted from the motor 13.

A motor-generator 20 is disposed along a rotating shaft 11 that mechanically connects the first compressor 8A and the turbine 9. The motor-generator 20 is an apparatus that functions as both an electric motor and a generator. Therefore, the motor-generator 20 can be used as a motor for driving the first compressor 8A, or can be used as a generator for converting mechanical energy generated in the turbine 9 into electrical energy. That is, the motor-generator 20 is configured to generate electric power with the power of the turbine 9 and supply rotational power to the first compressor 8A on the high-pressure side.

It is necessary to increase the output of the first compressor 8A on the high-pressure side when the output of the aircraft reciprocating engine 1A is increased to accelerate the aircraft 2 or when the aircraft reciprocating engine 1A is started, as described above. Therefore, when the aircraft 2 is accelerated or the aircraft reciprocating engine 1A is started at high altitude, the motor-generator 20 can be operated as an electric motor to provide rotational power to the first compressor 8A.

That is, the first compressor 8A can be rotated by both the rotational torque transmitted from the turbine 9 and the rotational torque transmitted from the motor-generator 20. As a result, the first compressor 8A can be driven with an output larger than the output of the first compressor 8A obtained by being driven by the turbine 9 alone.

On the other hand, when it is not necessary to increase the output of the first compressor 8A on the high-pressure side, that is, when the output of the aircraft reciprocating engine 1A is lowered or when the output of the aircraft reciprocating engine 1A is maintained during cruising of the aircraft 2, the motor-generator 20 can be operated as a generator. More specifically, the motor-generator 20 may be configured to generate power with the remaining power obtained by subtracting the rotational power of the first compressor 8A from the power generated by the turbine 9 when the output of the aircraft reciprocating engine 1A decreases or when the output of the aircraft reciprocating engine 1A is maintained. In this case, the first compressor 8A on the high-pressure side is driven by directly utilizing the mechanical energy from the turbine 9.

The motor-generator 20 is electrically connected to the battery 16. Thus, the electric power generated by the motor-generator 20 can be stored in the battery 16. Also connected to the battery 16 are the motors 13 for providing rotational power to the second compressor 8B and the third compressor 8C, respectively. Therefore, the motor-generator 20 and the motors 13 can be driven by electric power stored in the battery 16.

That is, when the aircraft 2 is cruising, the motor-generator 20 is used as a generator for generating electric energy by utilizing the energy remaining without being consumed for driving the first compressor 8A on the high-pressure side from the mechanical energy generated by the turbine 9, thereby converting the mechanical energy generated by the turbine 9 into electric energy for driving the second compressor 8B on the intermediate-pressure side and the third compressor 8C on the low-pressure side, while the motor-generator 20 can be used as a motor for the first compressor 8A at the time of accelerating the aircraft 2 or at the time of starting the reciprocating engine 1A for the aircraft at high altitude.

The motor-generator 20, the motors 13 and the battery can be controlled by a compressor control unit 14. Specifically, the compressor control unit 14 has a function of switching between a mode in which the motor-generator 20 is operated as an electric motor and a mode in which the motor-generator 20 is operated as a generator, a function of rotating each motor 13 at a predetermined rotational speed by supplying electric power to each motor 13 from the battery 16 with outputting a control signal, and a function of switching between a charging mode and a discharging mode in which the battery 16 is used as a power source.

That is, the compressor control unit 14, by outputting control signals to the motor-generator 20, each motor 13, and the battery 16, has a function of switching between a cruising mode, in which the first compressor 8A on the high-pressure side is driven by the mechanical energy from the turbine 9 alone, and an output increasing mode, in which the first compressor 8A on the high-pressure side is driven by mechanical energy converted from electrical energy from the motor-generator 20 in addition to mechanical energy from the turbine 9.

Further, as in the first example, the compressor control unit 14 may be provided with a function of determining the rotational speed of the first compressor 8A for the high-pressure stage, the second compressor 8B for the intermediate-pressure stage, the third compressor 8C for the low-pressure stage, the motor generator 20, and the motor 13 so that the first compressor 8A for the high-pressure stage, the second compressor 8B for the intermediate-pressure stage, and the third compressor 8C for the low-pressure stage are driven with better energy efficiency.

Figure 3:
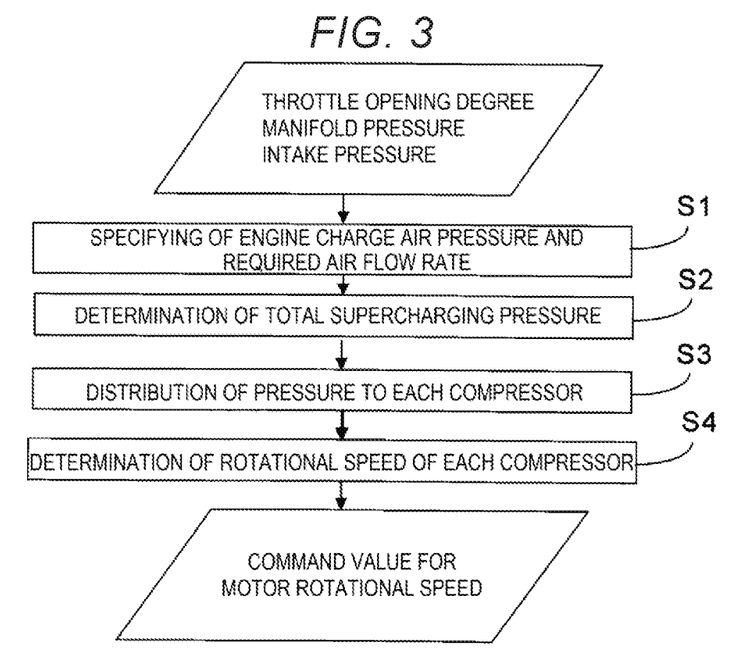
FIG. 3 is a flowchart illustrating content of information processing for determining a rotational speed of a compressor in a compressor control unit illustrated in FIG. 2.

FIG. 3 is a flowchart showing the content of information processing for determining the rotational speed of the compressor 8 in the compressor control unit 14 shown in FIG. 2.

The appropriate rotational speed of each compressor 8 can be calculated by using the opening degree of the throttle 4, the manifold pressure of the compressed air at the inlet of the piston 3 disposed in the reciprocating engine 1A for the aircraft 2, and the intake pressure of air taken in from the outside toward the plurality of compressors 8 as input data.

The opening degree of the throttle 4 can be obtained as control information of the opening degree of the throttle 4 from the engine control unit 5. On the other hand, the measured manifold pressure and the intake pressure of the aircraft reciprocating engine 1A can be obtained from the first pressure sensor 18 A and the third pressure sensor 18 C, respectively, similar to the first example. Further, similar to the first example, the second pressure sensor 18B can measure the pressure of air at the inlet of the aircraft reciprocating engine 1A for confirmation.

When the opening degree of the throttle 4, the intake pressure to the supercharging system 7A, and the manifold pressure of the aircraft reciprocating engine 1A are obtained as input data, the charge air pressure required for the aircraft reciprocating engine 1A and the required mass flow rate of air are specified in step S1. Specifically, if the opening degree of the throttle 4 is known, the required mass flow rate at the inlet of the aircraft reciprocating engine 1A for maintaining the charge air pressure required for the aircraft reciprocating engine 1A at about atmospheric pressure can be specified.

When the charge air pressure and the required mass flow rate required for the aircraft reciprocating engine 1A are specified, the total supercharging pressure required for the supercharging system 7A, that is, the difference pressure between the intake pressure of the air taken in from the atmosphere and the pressure of the compressed air discharged from the supercharging system 7A can be calculated in step S2.

Specifically, based on the charge air pressure and the required mass flow rate required for the aircraft reciprocating engine 1A, the engine control unit 5 can predict changes in the manifold pressure and flow rate of the air in the pipe branched toward the pistons 3 of the aircraft reciprocating engine 1A based on the measured values of the current intake pressure and manifold pressure, and calculate the target values of the manifold pressure and flow rate.

Instead of predicting a change in the manifold pressure in the engine control unit 5, the first pressure sensor 18A may measure the change in the manifold pressure. In this case, the response in the compressor control unit 14 is delayed by several hundred milliseconds, but the information processing in the compressor control unit 14 can be simplified.

When the respective target values of the manifold pressure and the flow rate of the air at the inlet of each piston 3 are calculated, the total supercharging pressure required for the supercharging system 7A to set the manifold pressure and the flow rate to the respective target values can be obtained based on the current measured values of the intake pressure and the manifold pressure. The total supercharging pressure required for the supercharging system 7A is the pressure of air to be increased in the first compressor 8A for the high-pressure stage, the second compressor 8B for the intermediate-pressure stage, and the third compressor 8C for the low-pressure stage.

Next, in step S3, the pressure is distributed to the first compressor 8A for the high-pressure stage, the second compressor 8B for the intermediate-pressure stage, and the third compressor 8C for the low-pressure stage. In this case, as described in the first example, it is preferable to distribute the pressure to the first compressor 8A for the high-pressure stage, the second compressor 8B for the intermediate-pressure stage, and the third compressor 8C for the low-pressure stage so that the first compressor 8A for the high-pressure stage, the second compressor 8B for the intermediate-pressure stage, and the third compressor 8C for the low-pressure stage are all driven with high efficiency.

The energy efficiency of each compressor 8 can be evaluated with reference to a compressor map. The compressor control unit 14 can then store a compressor map representing the energy efficiency of each compressor 8. The compressor control unit 14 may be provided with a function of determining the pressure distribution of air in each compressor 8 so that the energy efficiency of each compressor 8 becomes equal to or higher than a predetermined efficiency based on the compressor map.

Figure 4A:
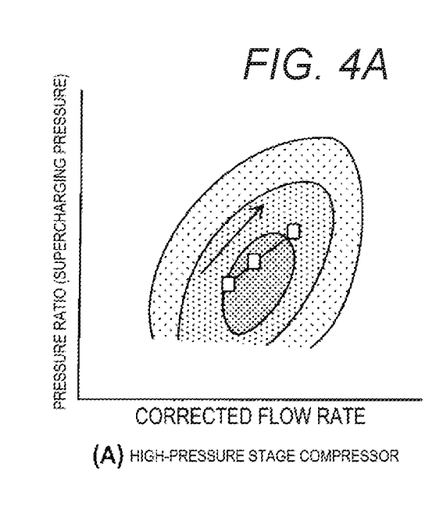
FIGS. 4A, 4B, and 4C are graphs illustrating compressor maps and control instances of a first compressor for a high-pressure stage, a second compressor for a intermediate-pressure stage, and a third compressor for a low-pressure stage illustrated in FIG. 2, respectively.

FIGS. 4A, (B), and (C) are graphs illustrating compressor maps and control examples of the first compressor 8A for the high-pressure stage, the second compressor 8B for the intermediate-pressure stage, and the third compressor 8C for the low-pressure stage, respectively, illustrated in FIG. 2.

Figure 4B:
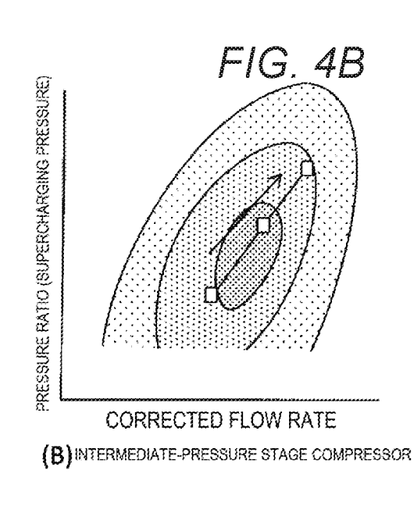
Figure 4C:
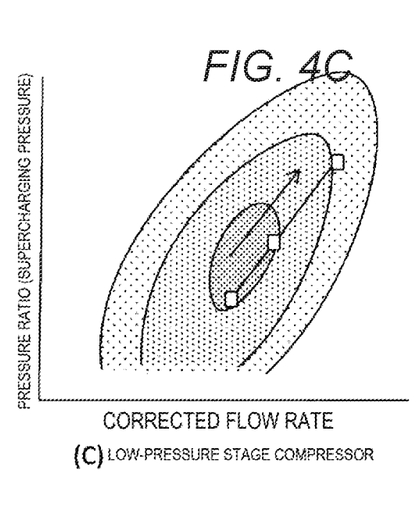

As illustrated in FIGS. 4A, (B), and (C), the compressor maps are two-dimensional representations of the efficiency of the compressor 8 with the vertical axis as the supercharging pressure corresponding to the pressure ratio of air and the horizontal axis as the flow rate of air. The pressure ratio of the air is the ratio of the pressure of air at the inlet of the compressor 8 to the pressure of air at the outlet of the compressor 8. The flow rate of air serving as the horizontal axis of the compressor map is usually a flow rate which is made dimensionless referencing the flow rate of air at the inlet of the compressor 8 with the flow rate of air on the ground. The dimensionless flow rate, which is the horizontal axis of the compressor map, is referred to as the corrected flow rate.

Each curve on the compressor map indicates that the energy efficiency is constant, and the energy efficiency becomes higher at the center. That is, each curve is an equal energy-efficiency curve, and the inner equal-energy efficiency curve illustrates a higher value. Therefore, it is preferable from the viewpoint of improving the energy efficiency of each compressor 8 that each compressor 8 is driven, as much as possible, under conditions within the inner area surrounded by the equal energy-efficiency curve in the compressor map.

The flow rate of air in each compressor 8 corresponds to the required mass flow rate of air to be supplied to the aircraft reciprocating engine 1A. When the output of the aircraft reciprocating engine 1A is increased or when the aircraft reciprocating engine 1A is started at high altitude, the mass flow rate of air to be supplied to the aircraft reciprocating engine 1A usually increases gradually. Therefore, the distribution of the charge air pressure of each compressor 8 can be determined so that the efficiency of each compressor 8 becomes higher when the flow rate of air at each compressor 8 reaches the corresponding set value. That is, the compressor control unit 14 may be configured to determine the pressure distribution of the air in each of the compressors such that the efficiency of each of the plurality of compressors 8 is within a predetermined range.

In the examples illustrated in FIGS. 4A, (B), and (C), the supercharging pressure of each compressor 8 is determined such that as the flow rate of air increases, the supercharging pressure of each compressor 8 also increases. Therefore, a polygonal line indicating a change in the relationship between the flow rate of air and the supercharging pressure in each compressor 8 is a polygonal line that rises to the right and passes through an area having high efficiency on each compressor map. In other words, the supercharging pressure of air in each compressor 8 can be determined so that a line indicating a change in the relationship between the flow rate of air and the supercharging pressure in each compressor 8 passes through an area having high efficiency on each compressor map.

Figure 5A:
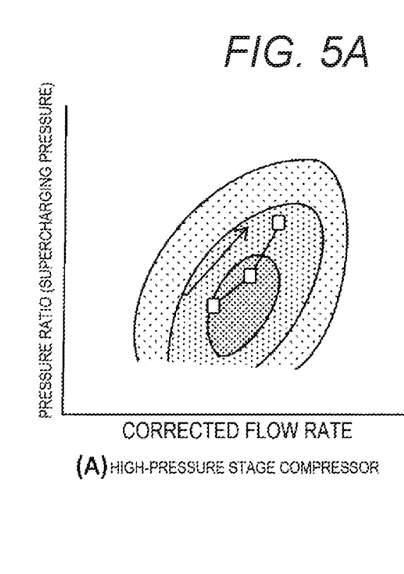
FIGS. 5(A), 5(B), and 5(C) are graphs illustrating compressor maps and control instances of a compressor for a high-pressure stage, a compressor for a intermediate-pressure stage, and a compressor for a low-pressure stage, respectively, which are provided in a conventional reciprocating engine with a three-stage mechanical turbocharger.
Figure 5B:
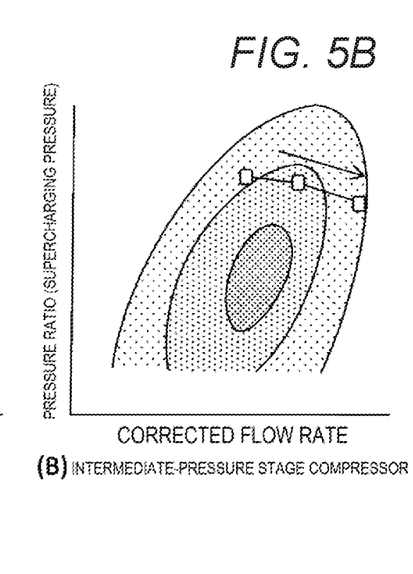
Figure 5C:
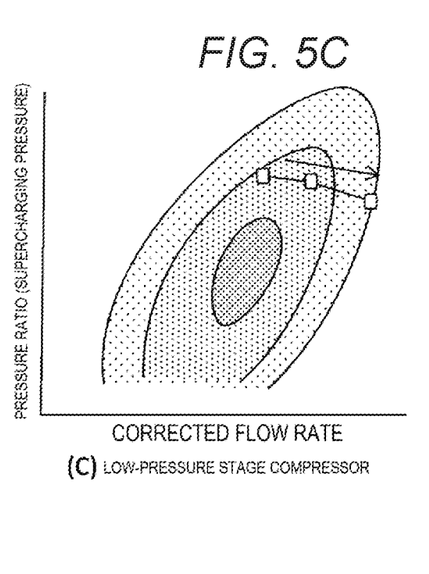

FIGS. 5(A), (B), and (C) are graphs illustrating compressor maps and control examples of high-pressure stage compressors, intermediate-pressure stage compressors, and low-pressure stage compressors, respectively, provided in a conventional three-stage mechanical turbocharger reciprocating engine.

FIGS. 5(A), (B), and (C) illustrates compressor maps for high-pressure stage compressors, intermediate-pressure stage compressors, and low-pressure stage compressors, respectively. That is, in the graphs of FIGS. 5(A), (B) and (C), the vertical axis illustrates the pressure ratio (i.e., the supercharging pressure) of each compressor, and the horizontal axis illustrates the corrected dimensionless flow rate of air at the inlet of each compressor.

When the compressor for the high-pressure stage, the compressor for the intermediate-pressure stage, and the compressor for the low-pressure stage are rotated by the turbine rotated by energy of the exhaust gas, the rotational speeds of the compressor for the high-pressure stage, the compressor for the intermediate-pressure stage, and the compressor for the low-pressure stage are the rotational speeds of the turbine rotated by the exhaust gas, respectively. In a typical mechanical turbocharger, a waste gate valve is connected in parallel to each turbine, and the rotational speed of the turbine is controlled so that each turbine does not rotate at an excessive rotational speed. In a typical mechanical turbocharger, the supercharging pressures of the intermediate-pressure stage compressor and the low-pressure stage compressor are controlled to be substantially constant by controlling the waste gate valve, and the total supercharging pressure of the mechanical turbocharger is controlled by changing the supercharging pressure of the high-pressure stage compressor.

Therefore, when the flow rate of compressed air supplied from the mechanical turbocharger to the reciprocating engine is set, the high-pressure stage compressor rotates at the rotational speed of the turbine according to the flow rate of the exhaust gas, while the intermediate-pressure stage compressor and the low-pressure stage compressor rotate at a substantially constant rotational speed. In other words, it is not possible to control the rotational speed of the high-pressure stage compressor, the intermediate-pressure stage compressor, and the low-pressure stage compressor.

Therefore, the respective pressure ratios of the high-pressure stage compressor, the intermediate-pressure stage compressor, and the low-pressure stage compressor cannot be controlled, and the pressure distribution to the high-pressure stage compressor, the intermediate-pressure stage compressor, and the low-pressure stage compressor cannot be determined. As a result, the efficiencies of the compressor for the high-pressure stage, the compressor for the intermediate-pressure stage, and the compressor for the low-pressure stage are not necessarily good.

As a specific instance, when the flow rate of air in the high-pressure stage compressor, the intermediate-pressure stage compressor, and the low-pressure stage compressor is gradually increased, the pressure ratio in each of the high-pressure stage compressor, the intermediate-pressure stage compressor, and the low-pressure stage compressor changes, as illustrated in the line graph superimposed on the compressor maps of FIGS. 5(A), (B), and (C), with the flow rate of the exhaust gas. That is, when the flow rate of air is gradually increased, the pressure ratio of the high-pressure stage compressor increases so as to improve the efficiency of the high-pressure stage compressor with an increase in the flow rate of the exhaust gas, but in the intermediate-pressure stage compressor and the low-pressure stage compressor, even if the flow rate of air increases, the change in the pressure ratio is small and efficiency does not improve. Therefore, overall, the high-pressure stage compressor, the intermediate-pressure stage compressor, and the low-pressure stage compressor cannot be driven under a condition of good efficiency.

On the other hand, in the case of the supercharging system 7A illustrated in FIG. 2, since the first compressor 8A for the high-pressure stage, the second compressor 8B for the intermediate-pressure stage, and the third compressor 8C for the low-pressure stage rotate by receiving power from the motor-generator 20 or the motor 13, it is possible to control the rotational speed, that is, the pressure ratio, of the first compressor 8A for the high-pressure stage, the second compressor 8B for the intermediate-pressure stage, and the third compressor 8C for the low-pressure stage.

Accordingly, as illustrated in FIGS. 4A, (B), and (C), it is possible, based on the compressor map, to determine the pressure ratio of the first compressor 8A for the high-pressure stage, the second compressor 8B for the intermediate-pressure stage, and the third compressor 8C for the low-pressure stage so that efficiency is good. As a result, the first compressor 8A for the high-pressure stage, the second compressor 8B for the intermediate-pressure stage, and the third compressor 8C for the low-pressure stage can be used efficiently, and the energy efficiency can be improved as compared with a conventional multi-stage turbocharger.

Once the respective pressure ratios corresponding to the air flow rates of the first compressor 8A for the high-pressure stage, the second compressor 8B for the intermediate-pressure stage, and the third compressor 8C for the low-pressure stage have been determined, the number of revolutions and the rotational speed of the first compressor 8A for the high-pressure stage, the second compressor 8B for the intermediate-pressure stage, and the third compressor 8C for the low-pressure stage can be set in step S4. When the rotational speeds of the first compressor 8A for the high-pressure stage, the second compressor 8B for the intermediate-pressure stage, and the third compressor 8C for the low-pressure stage are set, the command values for the rotational speeds of the motor-generator 20 and the motor 13 for rotating the first compressor 8A for the high-pressure stage, the second compressor 8B for the intermediate-pressure stage, and the third compressor 8C for the low-pressure stage can be determined.

As described in the first example, the pressure of air at the inlet of the aircraft reciprocating engine 1A may be measured by the second pressure sensor 18B, and when the pressure of air at the inlet of the aircraft reciprocating engine 1A does not reach the charge air pressure, feedback control may be performed to increase the total supercharging pressure of the supercharging system 7A. In this case, the total supercharging pressure of the supercharging system 7A is controlled based on the air pressure measured by the second pressure sensor 18B.

When the rotational speeds of the motor-generator 20 and the motors 13 are set in the compressor control unit 14, control signals indicating command values for rotational speeds corresponding to the motor-generator 20 and the motors 13 are outputted from the compressor control unit 14. As a result, the first compressor 8A for the high-pressure stage, the second compressor 8B for the intermediate-pressure stage, and the third compressor 8C for the low-pressure stage can be driven at a high-efficiency pressure ratio corresponding to the flow rate of the air. As a result, it is possible to improve the energy efficiency of the first compressor 8A for the high-pressure stage, the second compressor 8B for the intermediate-pressure stage, and the third compressor 8C for the low-pressure stage.

Moreover, in the case of the supercharging system 7A illustrated in FIG. 2, since the first compressor 8A for the high-pressure stage, the second compressor 8B for the intermediate-pressure stage, and the third compressor 8C for the low-pressure stage are rotated by receiving power from the motor-generator 20 or the motor 13, unlike a conventional multi-stage turbocharger in which a plurality of compressors are rotated only by power from a turbine, the rotational speed can be instantaneously changed. That is, in the case of the supercharging system 7A illustrated in FIG. 2, by controlling the rotational speeds of the motor-generator 20 and the motor 13 by the compressor control unit 14, the respective pressure ratios of the first compressor 8A for the high-pressure stage, the second compressor 8B for the intermediate-pressure stage, and the third compressor 8C for the low-pressure stage can be controlled instantaneously.

Figure 6:
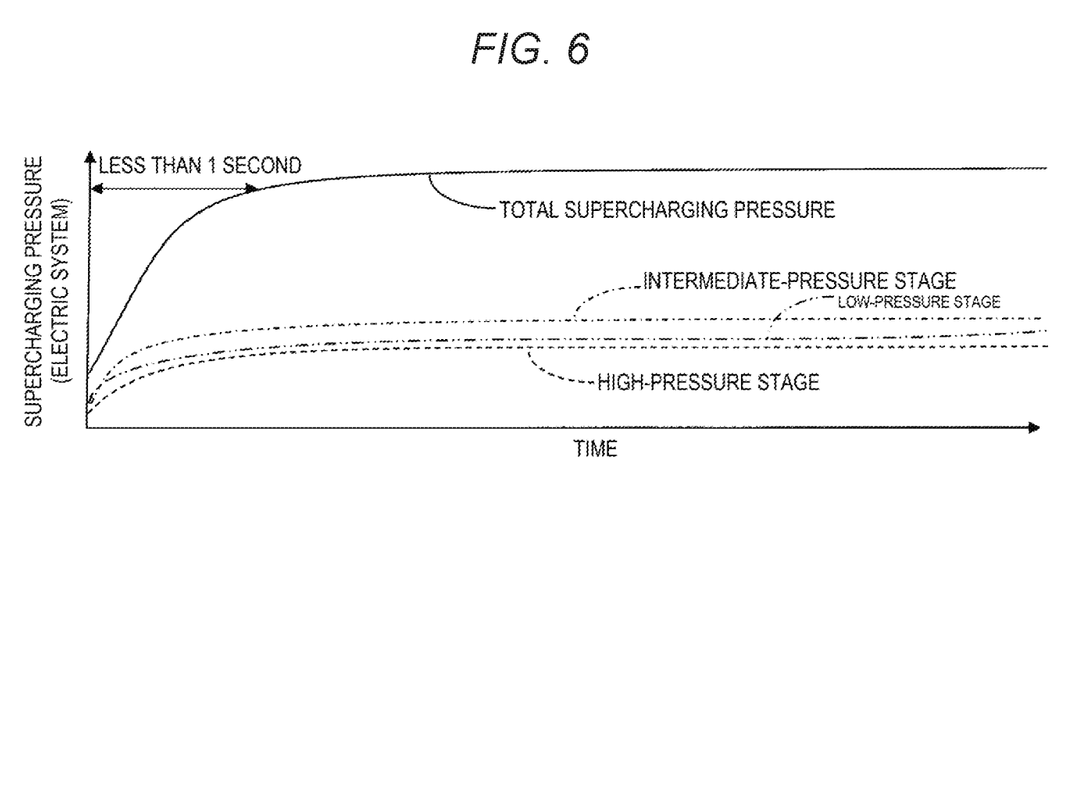
FIG. 6 is a graph illustrating a time variation of supercharging pressure by the electric supercharging system illustrated in FIG. 2.
Figure 7:
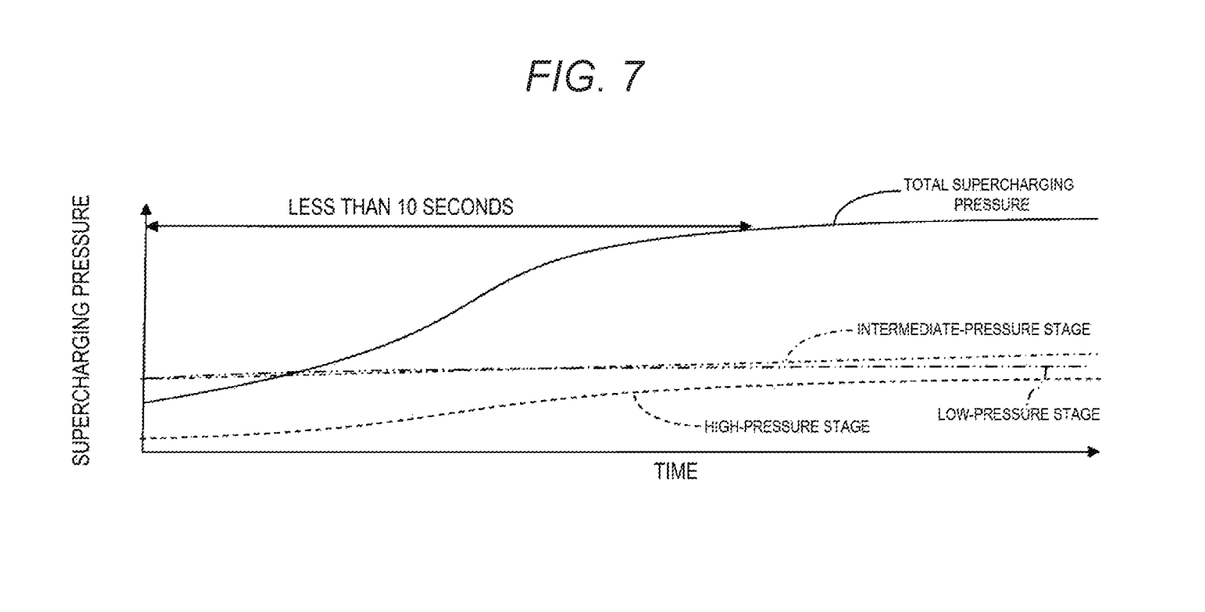
FIG. 7 is a graph illustrating a time variation of supercharging pressure of a mechanical turbocharger using a conventional turbine.

FIG. 6 is a graph illustrating the time variation of supercharging pressure by the electric supercharging system 7A illustrated in FIG. 2, and FIG. 7 is a graph illustrating the time variation of supercharging pressure by a mechanical turbocharger using a conventional turbine.

In FIG. 6 and FIG. 7, the horizontal axis represents time, and the vertical axis represents supercharging pressure. In FIG. 6 and FIG. 7, the solid line represents the total supercharging pressure of the electric supercharging system 7A and the conventional mechanical turbocharger, the dotted line represents the supercharging pressure of the high-pressure stage, the dashed-dotted line represents the supercharging pressure of the intermediate-pressure stage, and the dashed-double-dotted line represents the supercharging pressure of the low-pressure stage. The total supercharging pressure is the product of the supercharging pressure of the high-pressure stage, the supercharging pressure of the intermediate-pressure stage, and the supercharging pressure of the low-pressure stage.

In the case of increasing the total supercharging pressure of the three-stage mechanical turbocharger using a conventional turbine, as illustrated in FIG. 7, the supercharging pressure of the high-pressure stage compressor having a small volume flow rate is controlled so that the flow rate does not change significantly even if the supercharging pressure is changed. That is, the high-pressure stage compressor is gradually accelerated. On the other hand, the supercharging pressures of the low-pressure stage compressor and the intermediate-pressure stage compressor, which have a large volume flow rate impact, are kept constant.

In this case, a time response delay called a turbo lag occurs before the energy of the exhaust gas rises and the high-pressure stage compressor performs work as expected. As a specific instance, with a conventional mechanical turbocharged reciprocating engine of 250 hp, a turbo lag of less than 10 seconds occurs when accelerating from 25 hp to the maximum power.

Moreover, in the case of conventional mechanical turbochargers using turbines, since the supercharging pressure of the low-pressure stage compressor and the intermediate-pressure stage compressor is controlled to be constant, the low-pressure stage compressor and the intermediate-pressure stage compressor cannot be used efficiently, as described with reference to FIGS. 5(A), (B) and (C). Also, the excess energy of exhaust gas that is not recovered in each turbine is discarded.

On the other hand, in the case of the electric supercharging system 7A in which the first compressor 8A for the high-pressure stage, the second compressor 8B for the intermediate-pressure stage, and the third compressor 8C for the low-pressure stage are rotated by the motor-generator 20 and the motors 13, as illustrated in FIG. 6, the rotational speeds of the first compressor 8A for the high-pressure stage, the second compressor 8B for the intermediate-pressure stage, and the third compressor 8C for the low-pressure stage can be simultaneously and instantaneously increased. As a result, it is possible to drastically shorten the time to reach the total supercharging pressure required in the supercharging system 7A. More specifically, since the time required to obtain the total supercharging pressure required in the supercharging system 7A is the time required for the rotational speeds of the motor-generator 20 and the motors 13 to reach the command values by electronic control, the time can be shortened to a little less than one second.

The same applies to the two-stage supercharging system 7 illustrated in FIG. 1 exemplified as the first example. That is, the compressor control unit 14 can determine the pressure distribution of the air in the plurality of compressors 8 based on the control information of the opening degree of the throttle 4, the measured values of the manifold pressure and the intake pressure of the compressed air at the inlet of the piston 3 provided in the aircraft reciprocating engine 1, and the measured values of the intake pressure of the air taken in from the atmosphere toward the plurality of compressors 8 so that the energy efficiency is good, and can control the rotational speed of the motor 13 so that the compressed air is output from the respective compressors 8 with the determined pressure distribution of the air. When determining the pressure distribution of air in the plurality of compressors 8, the supercharging pressure of each compressor 8 can be determined, by referring to the compressor map representing the energy efficiency of each compressor 8, so that good energy efficiency is obtained.

According to the second example described above, the same effect as in the first example can be obtained also in the three-stage supercharging system 7A including the first compressor 8A for the high-pressure stage, the second compressor 8B for the intermediate-pressure stage, and the third compressor 8C for the low-pressure stage. That is, as described in the first example, even if the number of the compressors 8 provided in the supercharging system 7A increases as demand for the aircraft 2 to have flying capability at high altitudes increases, it is possible to shorten turbo lag, improve energy efficiency of the compressor 8, and start the aircraft reciprocating engine 1A at a high altitude.

OTHER EXAMPLES

While specific examples have been described above, the described examples are by way of example only and are not intended to limit the scope of the invention. The novel methods and equipment described herein may be embodied in a variety of other manners. Various omissions, substitutions and changes may be made in the manner of the methods and equipment described herein without departing from the spirit of the present invention. The appended claims and their equivalents include such various forms and modifications as fall within the scope and spirit of the present invention.

For instance, in each of the examples described above, the case where the aircraft reciprocating engines 1 and 1A are Otto cycle engines has been described as an example, but the supercharging systems 7 and 7A can also be provided in a diesel cycle engine.

The invention claimed is:

1. A supercharging system for an aircraft reciprocating engine, comprising:
   a plurality of compressors configured to supply compressed air to the aircraft reciprocating engine;
   a first compressor configured to be powered by a motor-generator and a turbine, wherein the motor-generator is configured to generate electric power with power of the turbine to supply rotational power to the first compressor; and
   a second compressor configured to be powered by a first motor,
   a third compressor configured to be powered by a second motor, wherein the first and second motors configured to provide rotational power to the second and third compressors wherein the second compressor and the third compressor are powered by the motors alone.

2. The supercharging system for the aircraft reciprocating engine according to claim 1, further comprising:
   a generator configured to generate electrical power by the power of the aircraft reciprocating engine, and
   a battery configured to store the electrical power generated by the generator, wherein
   the motors are configured to be driven by the electrical power stored in the battery.

3. The supercharging system for an aircraft reciprocating engine according to claim 1, further comprising:
   a battery configured to store the electric power generated by the motor-generator, wherein
   the motors and the motor-generator are configured to be driven by electrical power stored in the battery.

4. The supercharging system for an aircraft reciprocating engine according to claim 1, further comprising:
   a controller configured to drive the motors based on control information of the aircraft reciprocating engine.

5. The supercharging system of the aircraft reciprocating engine according to claim 1, wherein the controller drives the motors when the aircraft reciprocating engine is started or when output of the aircraft reciprocating engine is increased.

6. The supercharging system of the aircraft reciprocating engine according to claim 1, wherein the controller adjusts the motors based on an opening degree of a throttle, wherein the controller adjusts a flow rate of air supplied to the aircraft reciprocating engine by adjusting the motors.

7. The supercharging system of the aircraft reciprocating engine according to claim 6,
   wherein the controller determines a pressure distribution of air at each compressor,
   wherein the controller adjusts a rotational speed of the motors based on the determined pressure distribution of air each compressor, so that a compressed air is outputted from each compressor with the determined pressure distribution of air,
   wherein the controller determines the pressure distribution of air based on: (1) the opening degree of the throttle, (2) a measured pressure of compressed air at an inlet of a piston provided in the aircraft reciprocating engine, and (3) a measured pressure of air taken from the outside towards the plurality of compressors.

8. The aircraft reciprocating engine supercharging system according to claim 7,
   wherein the controller determines the pressure distribution of air at each of the compressors, and
   wherein efficiency of each of the plurality of compressors is within a predetermined range.

9. The aircraft reciprocating engine supercharging system according to claim 3, wherein the motor-generator is operable as an electric motor for providing rotational power to the first compressor when the aircraft reciprocating engine is started or when output of the aircraft reciprocating engine is increased, while the motor-generator is operable as an electric generator when the output of the aircraft reciprocating engine is decreased or when the output of the aircraft reciprocating engine is maintained.

10. The supercharging system of an aircraft reciprocating engine according to claim 3, wherein the motor-generator generates power with remaining power obtained by subtracting the rotational power of the first compressor from the power generated by the turbine when the output of the aircraft reciprocating engine drops or when the output of the aircraft reciprocating engine is maintained.

11. An aircraft reciprocating engine provided with the supercharging system according to claim 1.

12. An aircraft comprising the aircraft reciprocating engine of claim 11.

* * * * *